(12) United States Patent
Uchida

(10) Patent No.: US 10,146,079 B2
(45) Date of Patent: Dec. 4, 2018

(54) DISPLAY DEVICE COMPRISING A SHIELD LINE THAT OVERLAPS AN INTERSECTION AREA IN WHICH A FIRST SEMICONDUCTOR LAYER INTERSECTS A SCANNING LINE

(71) Applicant: Japan Display Inc., Minato-ku (JP)

(72) Inventor: Makoto Uchida, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/670,197

(22) Filed: Aug. 7, 2017

(65) Prior Publication Data

US 2018/0059473 A1  Mar. 1, 2018

(30) Foreign Application Priority Data

Aug. 29, 2016  (JP) .................................. 2016-166895

(51) Int. Cl.
| | |
|---|---|
| *G02F 1/1335* | (2006.01) |
| *G02F 1/1339* | (2006.01) |
| *G02F 1/1345* | (2006.01) |
| *G02F 1/1362* | (2006.01) |

(52) U.S. Cl.
CPC .... *G02F 1/133512* (2013.01); *G02F 1/13394* (2013.01); *G02F 1/13452* (2013.01); *G02F 1/136204* (2013.01); *G02F 1/136209* (2013.01); *G02F 1/136213* (2013.01)

(58) Field of Classification Search
CPC ............................................... G02F 1/136204
See application file for complete search history.

(56) References Cited

U.S. PATENT DOCUMENTS

| | | | | |
|---|---|---|---|---|
| 2002/0171086 A1* | 11/2002 | Miyajima | ......... | G02F 1/136213 257/72 |
| 2008/0284962 A1* | 11/2008 | Horiguchi | ......... | G02F 1/134363 349/139 |
| 2012/0314170 A1* | 12/2012 | Hisada | .............. | G02F 1/134336 349/138 |
| 2013/0038830 A1* | 2/2013 | Sato | .................. | G02F 1/134363 349/149 |
| 2013/0077010 A1* | 3/2013 | Takeda | .............. | G02F 1/134363 349/43 |
| 2014/0346504 A1* | 11/2014 | Misaki | ................ | H01L 21/0217 257/43 |
| 2015/0294993 A1* | 10/2015 | Kim | .................. | H01L 29/66969 257/43 |

FOREIGN PATENT DOCUMENTS

JP        2010-039810        2/2010

* cited by examiner

*Primary Examiner* — Paul Lee
(74) *Attorney, Agent, or Firm* — Oblon, McClelland, Maier & Neustadt, L.L.P.

(57) ABSTRACT

According to one embodiment, a display device comprises an insulating substrate, a pixel in a display area, a scanning line extending in a first direction, a signal line extending in a second direction, a shield line between the insulating substrate and the scanning line, a pixel electrode in the pixel, and a first switching element including a first semiconductor layer. The first semiconductor layer is provided between the scanning line and the shield line, and comprises an intersection area in which the first semiconductor layer intersects the scanning line. The shield line overlaps the intersection area, and is electrically connected to the scanning line through a contact portion.

8 Claims, 11 Drawing Sheets

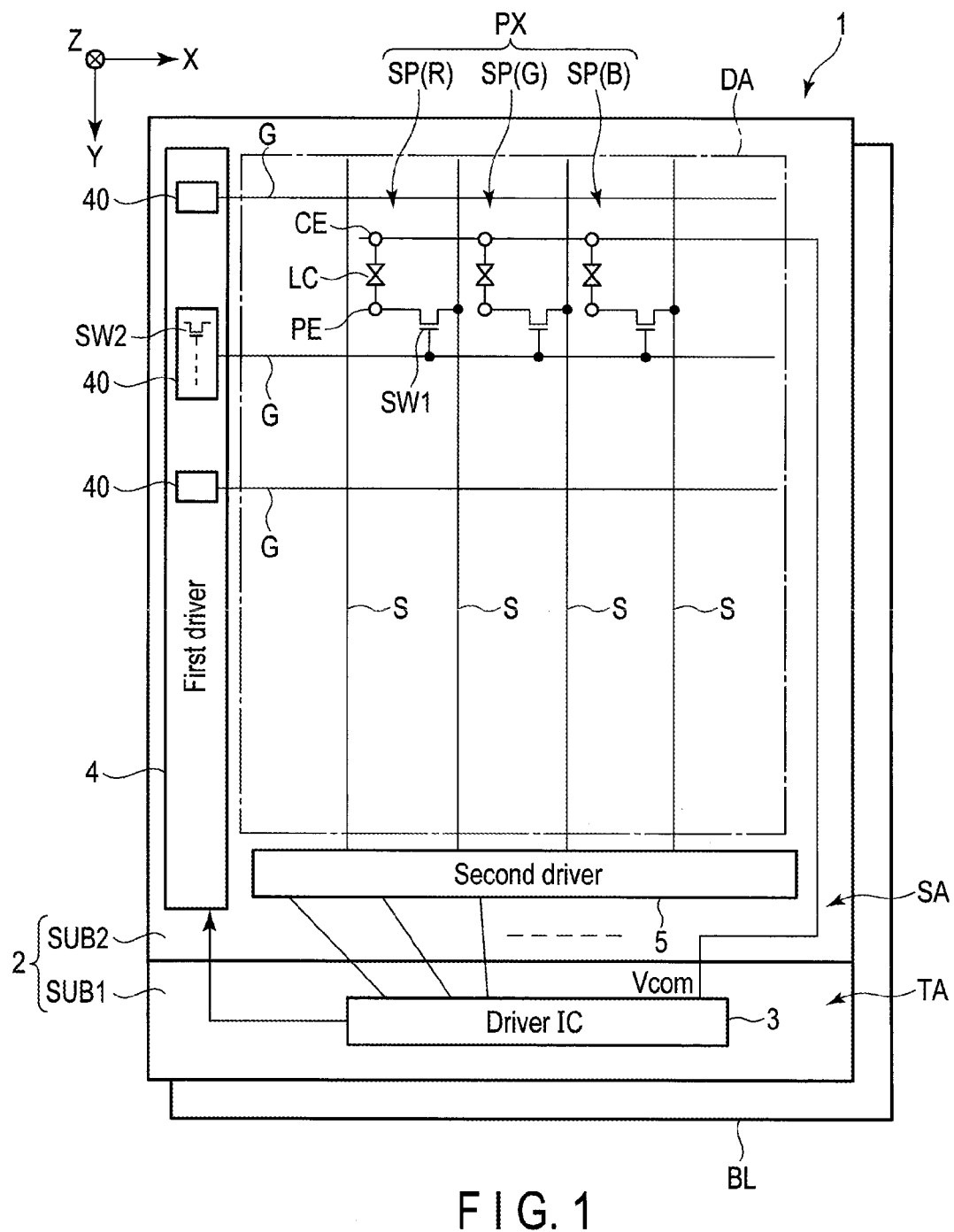
F I G. 1

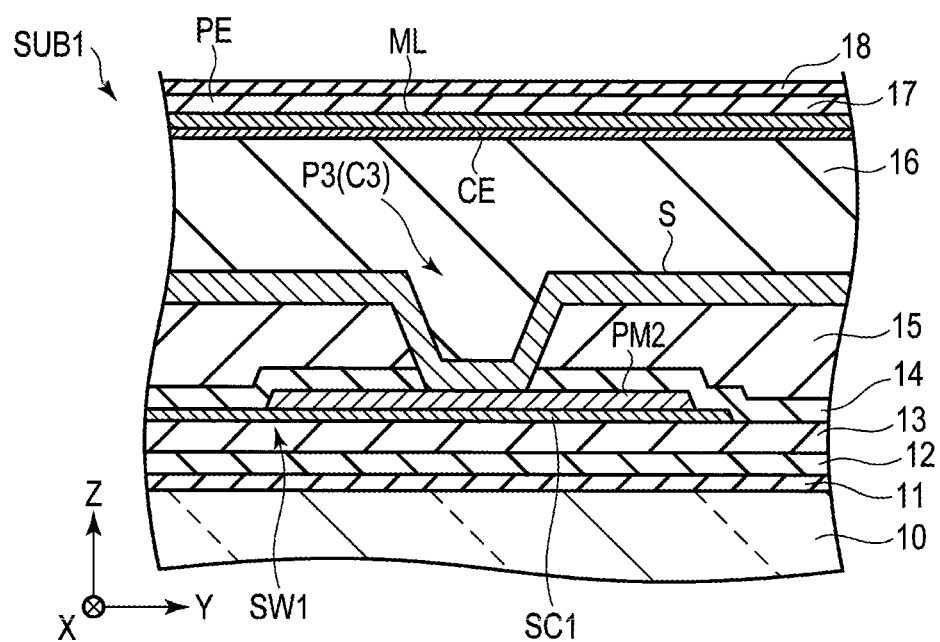
F I G. 5

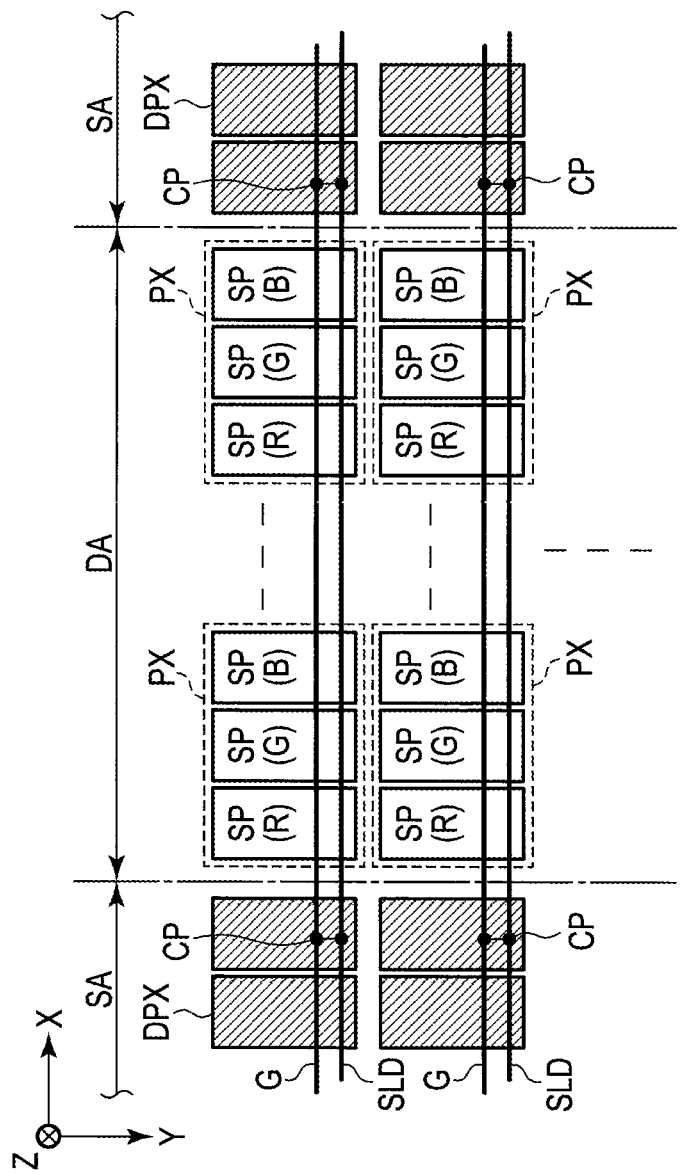
F I G. 11

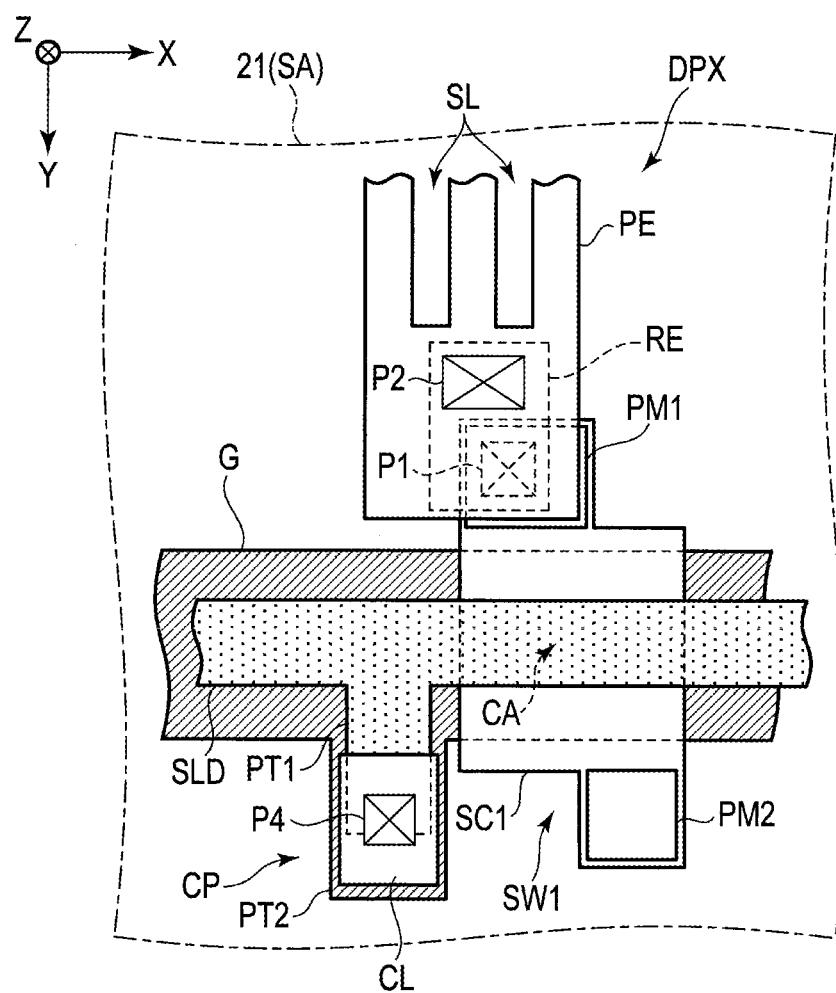
F I G. 12

DISPLAY DEVICE COMPRISING A SHIELD LINE THAT OVERLAPS AN INTERSECTION AREA IN WHICH A FIRST SEMICONDUCTOR LAYER INTERSECTS A SCANNING LINE

CROSS-REFERENCE TO RELATED APPLICATIONS

This application is based upon and claims the benefit of priority from Japanese Patent Application No. 2016-166895, filed Aug. 29, 2016, the entire contents of which are incorporated herein by reference.

FIELD

Embodiments described herein relate generally to a display device.

BACKGROUND

In display devices such as liquid crystal display devices, a switching element is provided for each pixel. When, for example, a backlight emits light to the channel area of a semiconductor layer in the switching element, leak current may be generated. Thus, a technology for using a metal layer to shield the channel area of the semiconductor layer from light has been suggested.

The metal layer is normally floating. Thus, the metal lines may be coupled to signal lines which supply video signals and pixel electrodes. In this way, the potential of the pixel electrodes may be changed by the effect of the potential of the signal lines. This effect is notably seen in pixels with high fineness. The change in the potential of pixel electrodes is visually recognized as a flicker, and leads to reduced display quality. When the pixels are driven at a low frequency, a flicker is easily recognized.

BRIEF DESCRIPTION OF THE DRAWINGS

FIG. 1 is a plan view showing a schematic structure of a display device according to a first embodiment.

FIG. 5 is a schematic cross-sectional view of a first substrate along line V-V of FIG. 3.

FIG. 11 is a schematic plan view showing an example of a layout of contact portions according to a third embodiment.

FIG. 12 is a schematic plan view of a dummy pixel and a contact portion provided in the dummy pixel.

DETAILED DESCRIPTION

Figure 2:
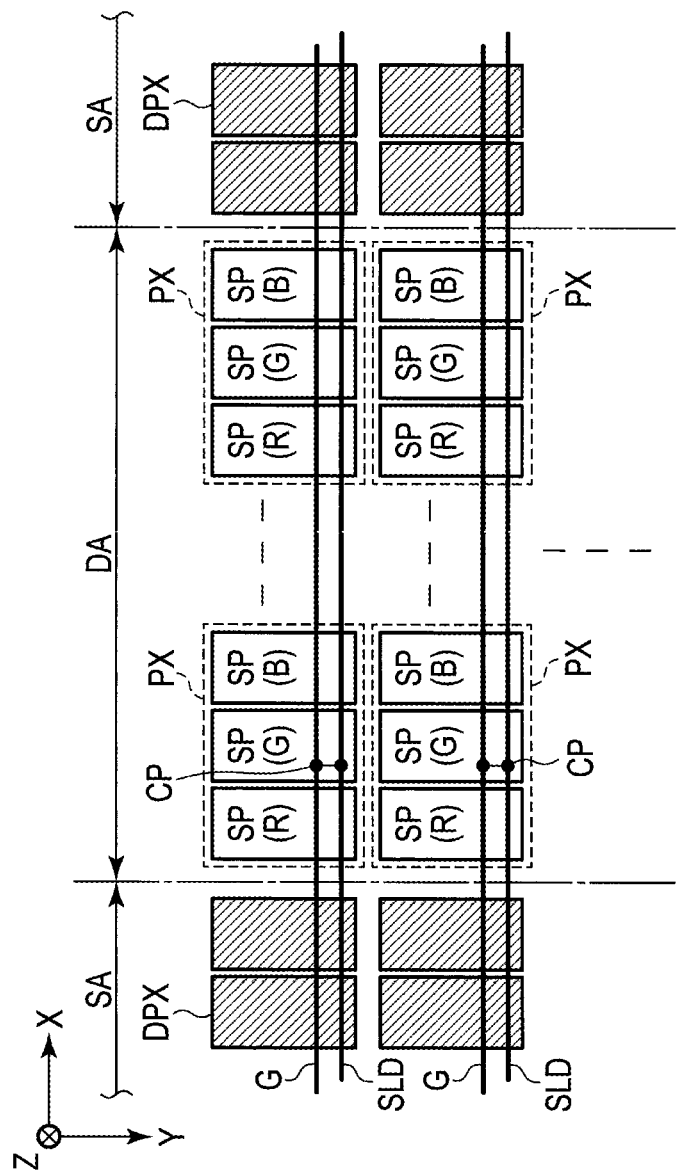
FIG. 2 is a schematic plan view showing an example of arrangement of pixels in the display device.

In general, according to one embodiment, a display device comprises an insulating substrate, a pixel provided in a display area, a scanning line extending in a first direction in the display area, a signal line extending in a second direction intersecting the first direction in the display area, a shield line provided between the insulating substrate and the scanning line, facing the scanning line and extending in the first direction, a pixel electrode provided in the pixel, and a first switching element including a first semiconductor layer and provided in the display area. The first semiconductor layer is provided between the scanning line and the shield line, and comprises an intersection area in which the first semiconductor layer intersects the scanning line. The shield line overlaps the intersection area in plan view, and is electrically connected to the scanning line through a contact portion.

The above structure allows provision of a display device capable of improving the display quality.

Various embodiments will be described with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, elements are illustrated schematically in the drawings, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

Each embodiment discloses a liquid crystal display device as an example of a display device. However, each embodiment does not preclude the application of individual technical ideas disclosed in the embodiment to other types of display devices. As other types of display devices, for example, self-luminous display devices comprising an organic electroluminescent display element, and electronic-paper display devices comprising a cataphoretic element can be considered.

First Embodiment

FIG. 1 is a plan view showing a schematic structure of a display device 1 according to a first embodiment. The display device 1 comprises a display panel 2, a driver IC 3 and a backlight BL. The display panel 2 comprises a first substrate (array substrate) SUB1, a second substrate (counter-substrate) SUB2 and a liquid crystal layer LC. The liquid crystal layer LC is an example of a display function layer. In the example of FIG. 1, the first substrate SUB1 is larger than the second substrate SUB2. The first substrate SUB1 is attached to the second substrate SUB2 such that three sides of the first substrate SUB1 are aligned with three sides of the second substrate SUB2. The liquid crystal layer LC is sealed in between the first substrate SUB1 and the second substrate SUB2.

In the area where the first substrate SUB1 overlaps the second substrate SUB2, the display panel 2 comprises a display area DA in which pixels PX for image display are formed, and a surrounding area SA around the display area DA. The display panel 2 further comprises a terminal area (non-counter area) TA in which the first substrate SUB1 does not overlap the second substrate SUB2.

In the display area DA, the first substrate SUB1 comprises a plurality of scanning lines G extending in a first direction X and arranged in a second direction Y, and a plurality of signal lines S extending in the second direction Y and arranged in the first direction X. In the example of FIG. 1, the scanning lines G and the signal lines S are shown by straight lines. However, the scanning lines G and the signal lines S may be curved or meander. In the following description, a direction perpendicular to the first direction X and the second direction Y (in other words, the thickness direction of the display device 1) is called a third direction Z. The direction from the first substrate SUB1 to the second substrate SUB2 is defined as "upward" (or "on" or "above"). The direction from the second substrate SUB2 to the first substrate SUB1 is defined as "downward" (or "under"). A plan view is defined as appearance seen in a direction from the second substrate SUB2 to the first substrate SUB1.

In the example of FIG. 1, the driver IC 3 is mounted in the terminal area TA. The backlight BL is provided under the display panel 2, and faces the display area DA. The backlight BL irradiates the display area DA from the lower side. For example, the backlight BL comprises a flat light guide plate, and a plurality of light sources arranged along an end surface of the light guide plate.

The first substrate SUB1 comprises a first driver (gate driver) 4 connected to each scanning line G, and a second driver (source driver) 5 connected to each signal line S. In the example of FIG. 1, the first driver 4 is provided in the surrounding area SA along one of the sides of the display area DA extending in the second direction Y. The second driver 5 is provided in the surrounding area SA between the display area DA and the terminal area TA. The first driver 4 and the second driver 5 may be provided on the first substrate 1 in another form, or may be provided outside the first substrate SUB1. A pair of first drivers 4 may be provided along the two sides of the display area DA extending in the second direction Y.

Each pixel PX includes a plurality of subpixels SP. Each subpixel SP corresponds to, for example, the area defined by two adjacent scanning lines G and two adjacent signal lines S. In the present disclosure, each subpixel may be simply called a pixel.

In the example of FIG. 1, each pixel PX includes three subpixels SP. The subpixels SP display, for example, red (R), green (G) and blue (B), respectively. It should be noted that each pixel PX may include more subpixels SP. The colors of the subpixels SP included in each pixel PX are not limited to red, green and blue, and may be other colors such as white and yellow.

In each subpixel SP, the first substrate SUB1 comprises a first switching element SW1 and a pixel electrode PE. A common electrode CE shared by a plurality of subpixels SP extends in each subpixel SP. The common electrode CE may be provided on either the first substrate SUB1 or the second substrate SUB2. Common voltage Vcom is applied from the driver IC 3 to the common electrode CE.

The driver IC 3 controls the first driver 4 and the second driver 5. The second driver 5 supplies a video signal to each signal line S. The second driver 5 may perform a column-inversion drive scheme which supplies a video signal to each signal line S such that the polarity of the video signal is inverted with respect to its adjacent signal lines S.

The first driver 4 comprises a plurality of vertical circuits 40. For example, each vertical circuit 40 includes a shift-register and a buffer. The shift-register of each vertical circuit 40 transfers a transfer pulse in series. The buffer of each vertical circuit 40 is connected to a corresponding scanning line G. The buffer of a vertical circuit 40 in which a transfer pulse has been input to the shift-register supplies a scanning signal to the scanning line G connected to the buffer of the vertical circuit 40.

Each vertical circuit 40 comprises a plurality of switching elements. The switching elements control the voltage of the scanning line G in cooperation with each other. At least some of the switching elements are equivalent to second switching elements SW2 as described later with reference to FIG. 8. Another circuit in the surrounding area SA, such as the second driver 5, may comprise the second switching elements SW2.

When a scanning signal is supplied to a scanning line G corresponding to a first switching element SW1, the video signal supplied to the signal line S connected to the first switching element SW1 is supplied to the pixel electrode PE connected to the first switching element SW1. At this time, an electric field is formed between the pixel electrode PE and the common electrode CE. This electric field has an influence on the liquid crystal layer LC. In this manner, each subpixel SP can be controlled so as to be in a state where light from the backlight BL is transmitted (on) or a state where the light is not transmitted (off).

FIG. 2 is a schematic plan view showing an example of arrangement of the pixels PX. In the display area DA, the pixels PX are arranged in matrix in the first direction X and the second direction Y. In the example of FIG. 2, the subpixels SP corresponding to colors R, G and B are arranged in the first direction X. The red subpixels SP (R) are arranged in the second direction Y. The green subpixels SP (G) are arranged in the second direction Y. The blue subpixels SP (B) are arranged in the second direction Y. The arrangement of the subpixels SP is not limited to this example.

In the surrounding area SA, dummy pixels DPX are arranged. The dummy pixels DPX are pixels which do not contribute to image display, and overlap a light-shielding layer 21 as seen in plan view as described later. In the example of FIG. 2, two dummy pixels DPX are adjacent to a subpixel SP on each side of the display area DA in the first direction X. The number of dummy pixels DPX adjacent to each subpixel SP may be one, or three or more.

The scanning lines G cross the display area DA and also extend in the surrounding area SA. In the present embodiment, a shield line SLD extends parallel to each scanning line G. The shield lines SLD extend in the first direction X in a manner similar to that of the scanning lines G, cross the display area DA, and also extend in the surrounding area SA. The shield lines SLD may not extend in the surrounding area SA.

The shield lines SLD are electrically connected to the scanning lines G through contact portions CP. In the present embodiment, the contact portions CP are provided in the display area DA. In the example of FIG. 2, only one contact portion CP is shown for a pair of scanning and shield lines G and SLD. However, more contact portions CP may be provided for a pair of scanning and shield lines G and SLD. In the example of FIG. 2, the contact portions CP are provided in the green subpixels SP. However, the contact portions CP may be provided in the subpixels SP of a different color.

Figure 3:
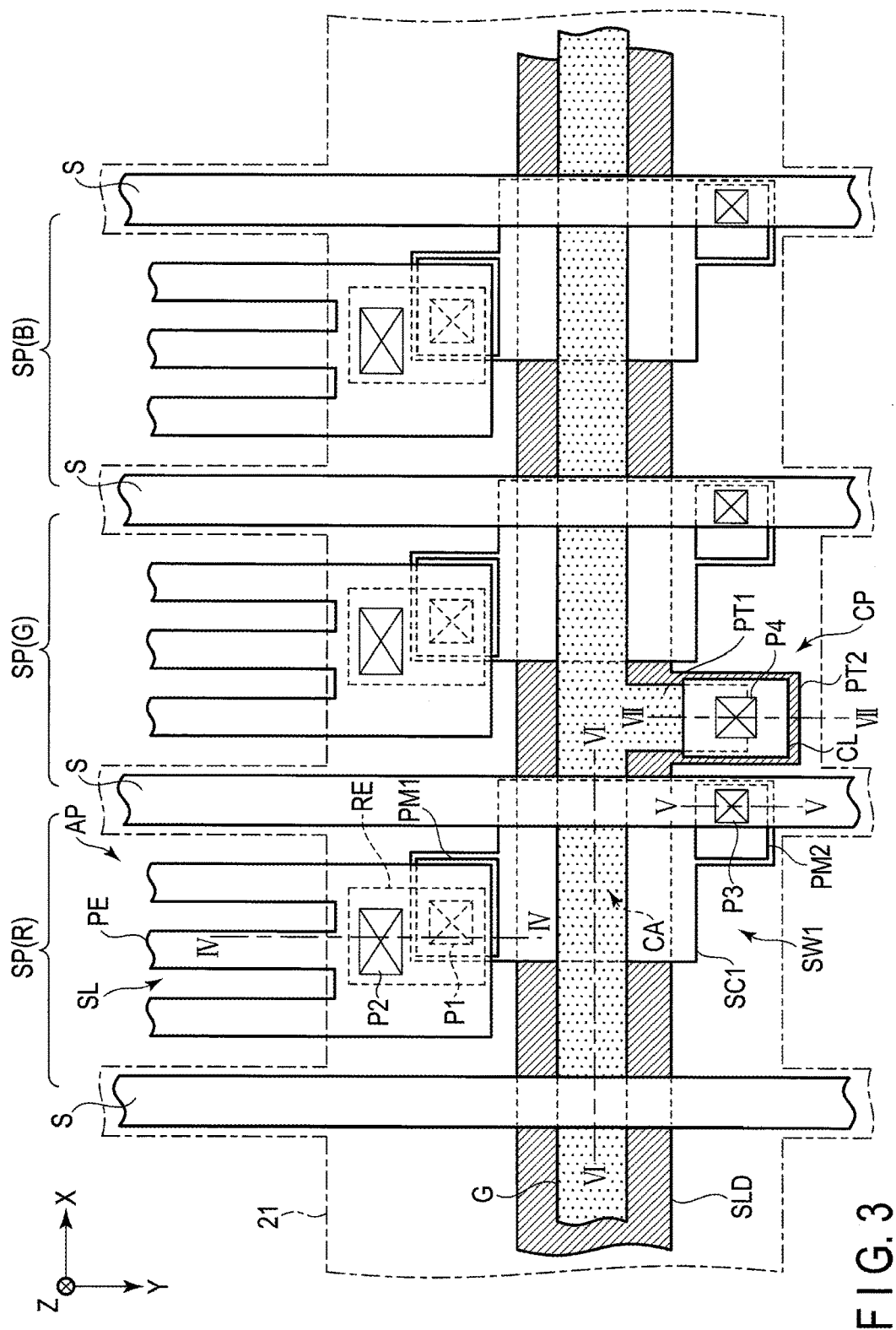
FIG. 3 is a schematic plan view of three subpixels included in a pixel.

FIG. 3 is a schematic plan view of three subpixels SP included in a pixel PX. The first switching element SW1 comprises a first semiconductor layer SC1 which is, for example, an oxide semiconductor. In the example of FIG. 3, the first semiconductor layer SC1 is provided between adjacent signal lines S, and intersects the scanning line G.

The first semiconductor layer SC1 comprises an intersection area (channel area) CA in which the first semiconductor layer SC1 intersects the scanning line G. The shape of the first semiconductor layer SC1 is not limited to the example of FIG. 3.

The first semiconductor layer SC1 is electrically connected to a relay electrode RE at position P1. The relay electrode RE is electrically connected to the pixel electrode PE at position P2. Further, the first semiconductor layer SC1 is electrically connected to the signal line S at position P3. The intersection area CA is provided between positions P1 and P2. In the example of FIG. 3, a conductive first protective layer PM1 is provided on the upper surface of the first semiconductor layer SC1 at position P1. A conductive second protective layer PM2 is provided on the upper surface of the first semiconductor layer SC1 at position P2. The first and second protective layers PM1 and PM2 may be formed of, for example, a metal material.

In the example of FIG. 3, the pixel electrode PE comprises two slits SL extending in the second direction Y. It should be noted that the pixel electrode PE may comprise more slits SL, or may not comprise any slit SL.

The shield line SLD extends in the first direction X along the scanning line G. The shield line SLD is provided under the scanning line G. The first semiconductor layer SC1 is provided between the shield line SLD and the scanning line G. In the example of FIG. 3, the shield line SLD overlaps the entire scanning line G as seen in plan view. Thus, the intersection area CA of the first semiconductor layer SC1 overlaps the shield line SLD as seen in plan view.

When light is emitted from the backlight BL to the intersection area CA, leak current may be generated in the first switching element SW1. The shield line SLD functions as a light-shielding film which blocks the light emitted from the backlight BL, and shields the intersection area CA from the light. The shield line SLD should merely overlap the intersection area CA as seen in plan view. The shape of the shield line SLD is not limited to the example of FIG. 3.

In the example of FIG. 3, the width of the shield line SLD in the second direction Y is greater than the width of the scanning line G in the second direction Y. In this way, the intersection area CA can be more assuredly protected from light. The width of the shield line SLD may be different from the example of FIG. 3. In other words, the width of the shield line SLD may not be constant. For example, the thickness of the shield line SLD may differ between the part overlapping the intersection area CA and the other portions.

All of the scanning line G, the signal line S, the relay electrode RE and the shield line SLD may be formed of a metal material. The pixel electrode PE may be formed of a transparent conductive material such as indium tin oxide (ITO). Although not shown in FIG. 3, the above common electrode CE faces the pixel electrode PE. The common electrode CE may be also formed of a transparent conductive material such as ITO.

The area shown by alternate long and short dash lines in FIG. 3 is equivalent to the light-shielding layer 21 which blocks light. The light-shielding layer 21 faces the signal lines S, the scanning line G, the first switching elements SW1, the shield line SLD and the relay electrodes RE. The light-shielding layer 21 comprises an aperture AP in each subpixel SP. The pixel electrodes PE extend in the apertures AP.

The above contact portion CP comprises a first protrusion PT1 protruding from the scanning line G, a second protrusion PT2 protruding from the shield line SLD, and a conductive layer CL. The conductive layer CL is in contact with the first protrusion PT1 and the second protrusion PT2 at position P4. The conductive layer CL may be formed of, for example, a metal material. Alternatively, the conductive layer CL may be formed of a transparent conductive material such as ITO. In the example of FIG. 3, the first protrusion PT1 and the second protrusion PT2 protrude in the second direction Y. However, the first protrusion PT1 and the second protrusion PT2 may protrude in another direction intersecting the first direction X.

Thus, in the contact portion CP of FIG. 3, the scanning line G is electrically connected to the shield line SLD through the conductive layer CL. The structure of the contact portion CP is not limited to the example shown in FIG. 3. For example, the scanning line G may be electrically connected to the shield line SLD either in a direct way or through the conductive layer CL in the area where the scanning line G overlaps the shield line SLD without using the first protrusion PT1 and the second protrusion PT2.

In the example of FIG. 3, the contact portion CP is provided in the green subpixel SP. Further, the light-shielding layer 21 is wider in the second direction Y at the position of the contact portion CP than the other positions. In this way, the entire contact portion CP overlaps the light-shielding layer 21 as seen in plan view.

Figure 4:
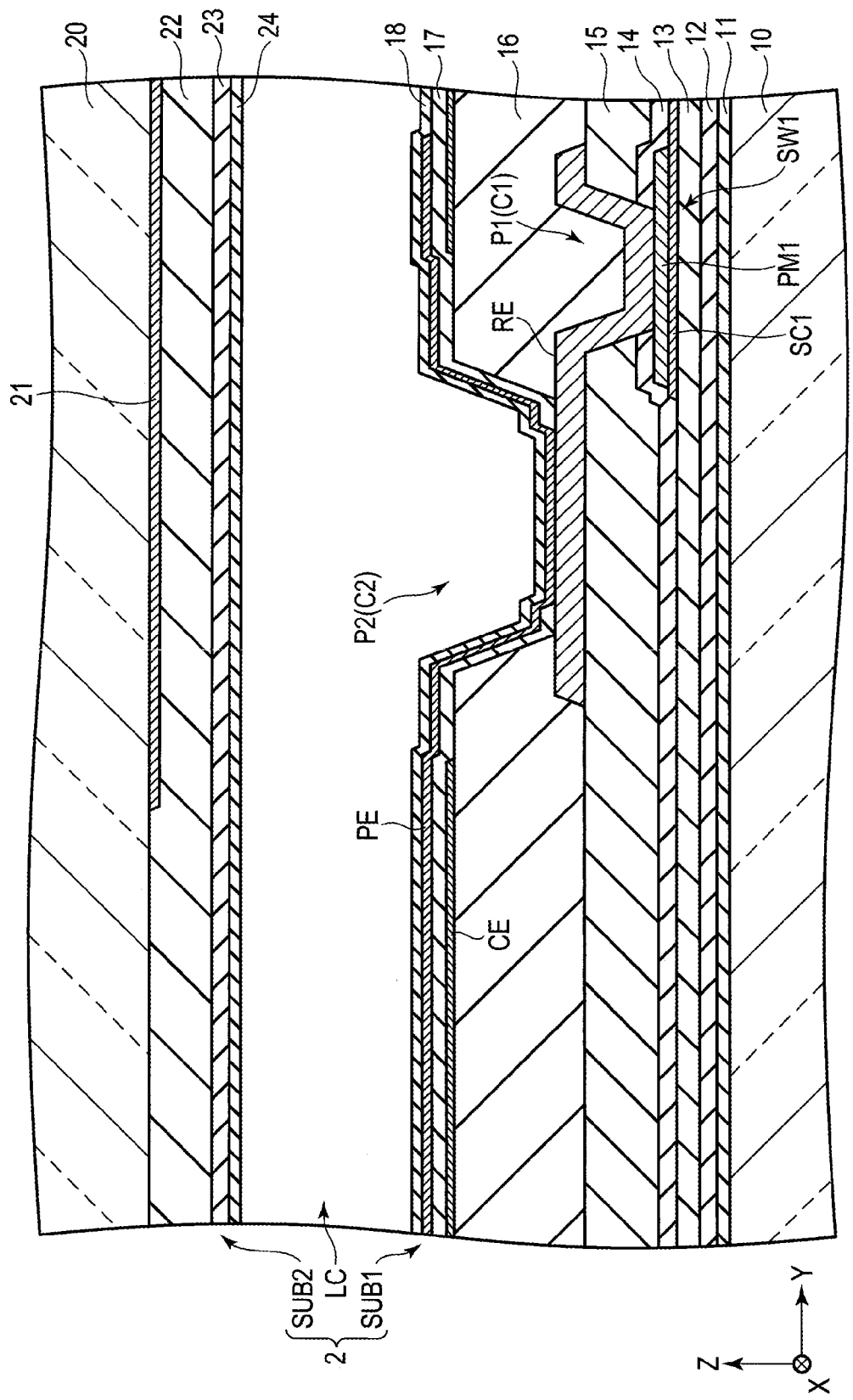
FIG. 4 is a schematic cross-sectional view of a display panel along line IV-IV of FIG. 3.

FIG. 4 is a schematic cross-sectional view of the display panel 2 along line IV-IV of FIG. 3. The first substrate SUB1 comprises a first insulating substrate 10, a first insulating layer 11, a second insulating layer 12, a third insulating layer 13, a fourth insulating layer 14, a fifth insulating layer 15, a sixth insulating layer 16, a seventh insulating layer 17, a first alignment film 18, the above switching element SW1, the above relay electrode RE, the above pixel electrode PE and the above common electrode CE.

The first insulating substrate 10 is, for example, a transparent glass substrate or resin substrate. The first insulating layer 11 covers the upper surface of the first insulating substrate 10 (in other words, the face facing the second substrate SUB2). The second insulating layer 12 covers the first insulating layer 11. The third insulating layer 13 covers the second insulating layer 12. The first semiconductor layer SC1 is formed on the third insulating layer 13.

The first protective layer PM1 covers the upper surface of the first semiconductor layer SC1 at the above position P1. The fourth insulating layer 14 covers the first protective layer PM1, the first conductive layer SC1 exposed from the first protective layer PM1, and the third insulating layer 13. The fifth insulating layer 15 covers the fourth insulating layer 14.

The relay electrode RE is formed on the fifth insulating layer 15. The relay electrode RE is in contact with the first protective layer PM1 through a first contact hole C1 provided in the fourth insulating layer 14 and the fifth insulating layer 15 at position P1.

The sixth insulating layer 16 covers the relay electrode RE and the fifth insulating layer 15. The sixth insulating layer 16 is formed of, for example, an organic resin material, and is the thickest among the first to seventh insulating layers 11 to 17. Asperities which may be generated by the first switching element SW1 are made flat by the sixth insulating layer 16. The common electrode CE is formed on the sixth insulating layer 16. The seventh insulating layer 17 covers the common electrode CE and the sixth insulating layer 16.

The pixel electrode PE is formed on the seventh insulating layer 17. The first alignment film 18 covers the pixel electrode PE and the seventh insulating layer 17. The pixel electrode PE is in contact with the relay electrode RE through a second contact hole C2 provided in the sixth insulating layer 16 and the seventh insulating layer 17 at the above position P2.

The second substrate SUB2 comprises a second insulating substrate 20, a color filter layer 22, an overcoat layer 23, a second alignment film 24 and the above light-shielding layer 21. The second insulating substrate 20 is, for example, a transparent glass substrate or resin substrate. The light-shielding layer 21 is formed on the lower surface of the second substrate 20 (in other words, the face facing the first substrate SUB1). The color filter layer 22 covers the lower surfaces of the light-shielding layer 21 and the second insulating substrate 20. The color of the color filter layer 22 corresponds to each subpixel SP. The overcoat layer 23 covers the color filter layer 22. The second alignment film 24 covers the overcoat layer 23. The liquid crystal layer LC is provided between the first alignment film 18 and the second alignment film 24.

The structure shown in FIG. 4 is a structure applicable to an in-plane switching (IPS) mode in which the pixel electrode PE and the common electrode CE are provided on the first substrate SUB1, in particular, a fringe field switching (FFS) mode. However, the structure of the display device 1 is not limited to this example. For example, the common electrode CE may be provided on the second substrate SUB2. Further, on the first substrate SUB1, the common electrode CE may be closer to the liquid crystal layer LC than the pixel electrode PE.

FIG. 5 is a schematic cross-sectional view of the first substrate SUB1 along line V-V of FIG. 3. The second protective layer PM2 covers the upper surface of the first semiconductor layer SC1 at the above position P3. The second protective layer PM2 is covered with the fourth insulating layer 14.

The signal line S is formed on the fifth insulating layer 15, and is covered with the sixth insulating layer 16. The signal line S is in contact with the second protective layer PM2 through a third contact hole C3 provided in the fourth insulating layer 14 and the fifth insulating layer 15 at position P3. A metal line ML is formed on the common electrode CE. The metal line ML faces the signal line S, and extends along the signal line S (also see FIG. 6 below). It should be noted that FIG. 3 does not show the metal line ML.

Figure 6:
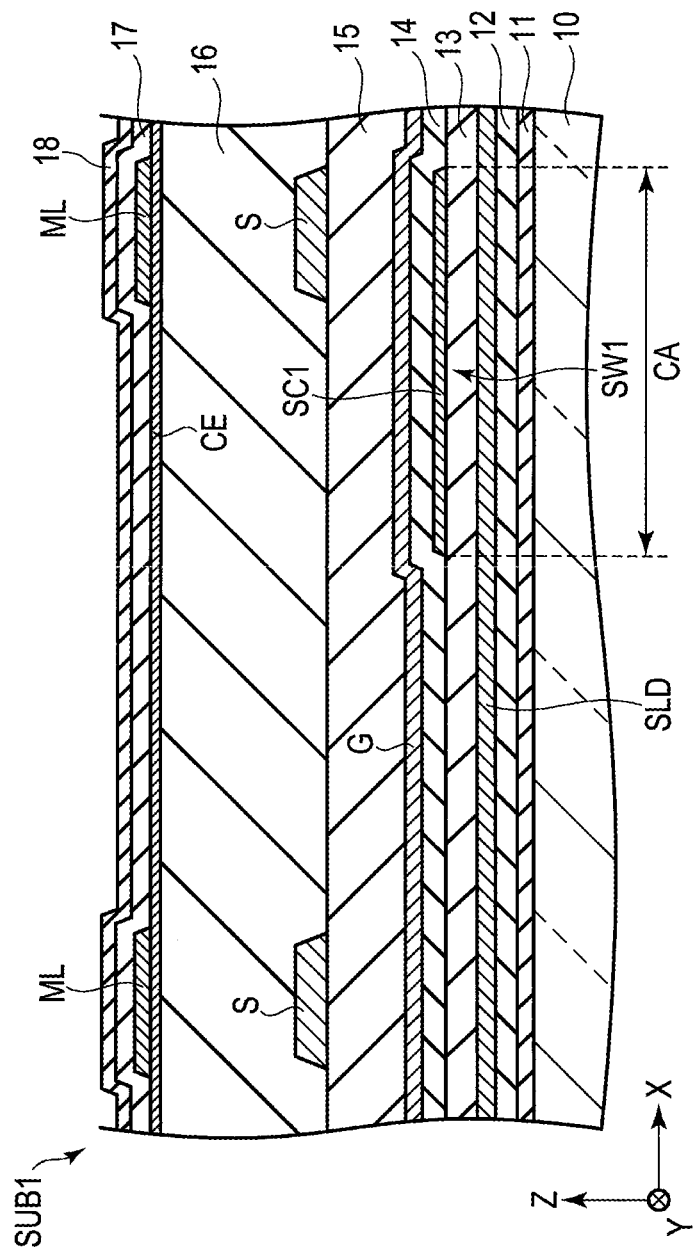
FIG. 6 is a schematic cross-sectional view of the first substrate along line VI-VI of FIG. 3.

FIG. 6 is a schematic cross-sectional view of the first substrate SUB1 along line VI-VI of FIG. 3. The shield line SLD is formed on the second insulating layer 12, and is covered with the third insulating layer 13. The lower surface of the intersection area CA of the first semiconductor layer SC1 faces the shield line SLD via the third insulating layer 13. The upper surface of the intersection area CA of the first semiconductor layer SC1 faces the scanning line G via the fourth insulating layer 14.

Figure 7:
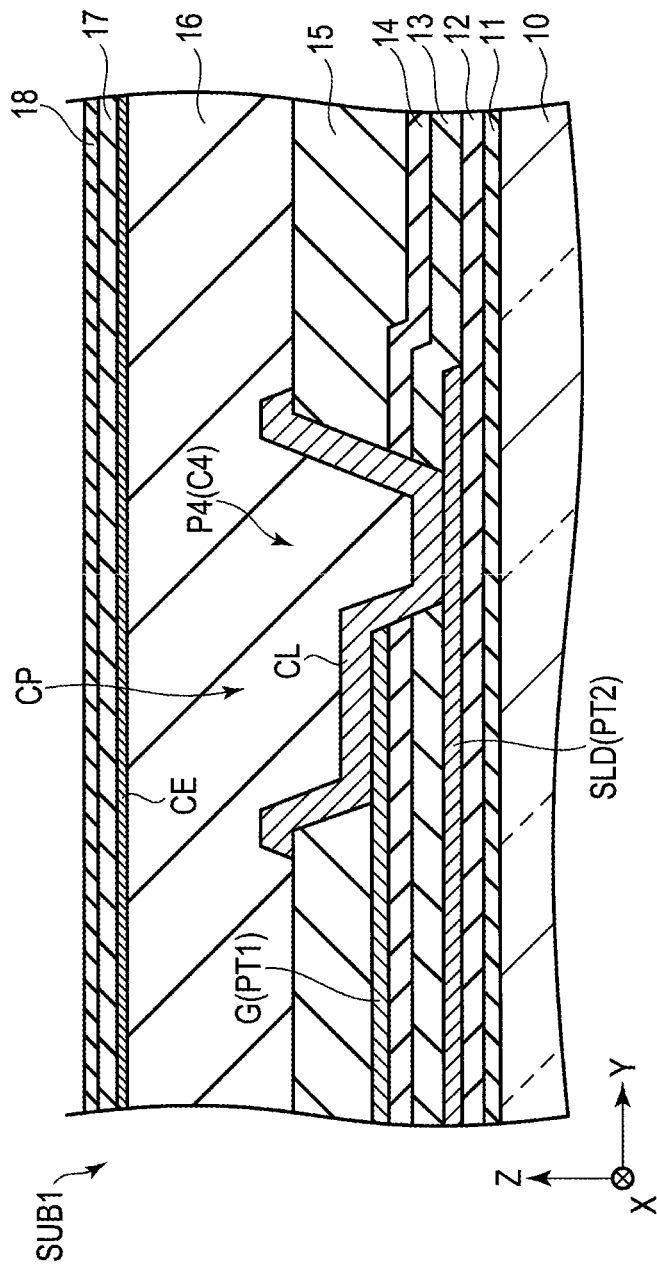
FIG. 7 is a schematic cross-sectional view of the first substrate along line VII-VII of FIG. 3.

FIG. 7 is a schematic cross-sectional view of the first substrate SUB1 along line VII-VII of FIG. 3. A fourth contact hole C4 penetrating the third insulating layer 13, the fourth insulating layer 14 and the fifth insulating layer 15 is provided at the above position P4. In the fourth contact hole C4, the scanning line G is partially exposed from the fifth insulating layer 15. Further, the shield line SLD is partially exposed from the third insulating layer 13, the fourth insulating layer 14 and the fifth insulating layer 15. The conductive layer CL is in contact with both the scanning line G and the shield line SLD through the fourth contact hole C4. In the example of FIG. 7, the conductive layer CL partially extends on the fifth insulating layer 15. The conductive layer CL is covered with the sixth insulating layer 16.

Figure 8:
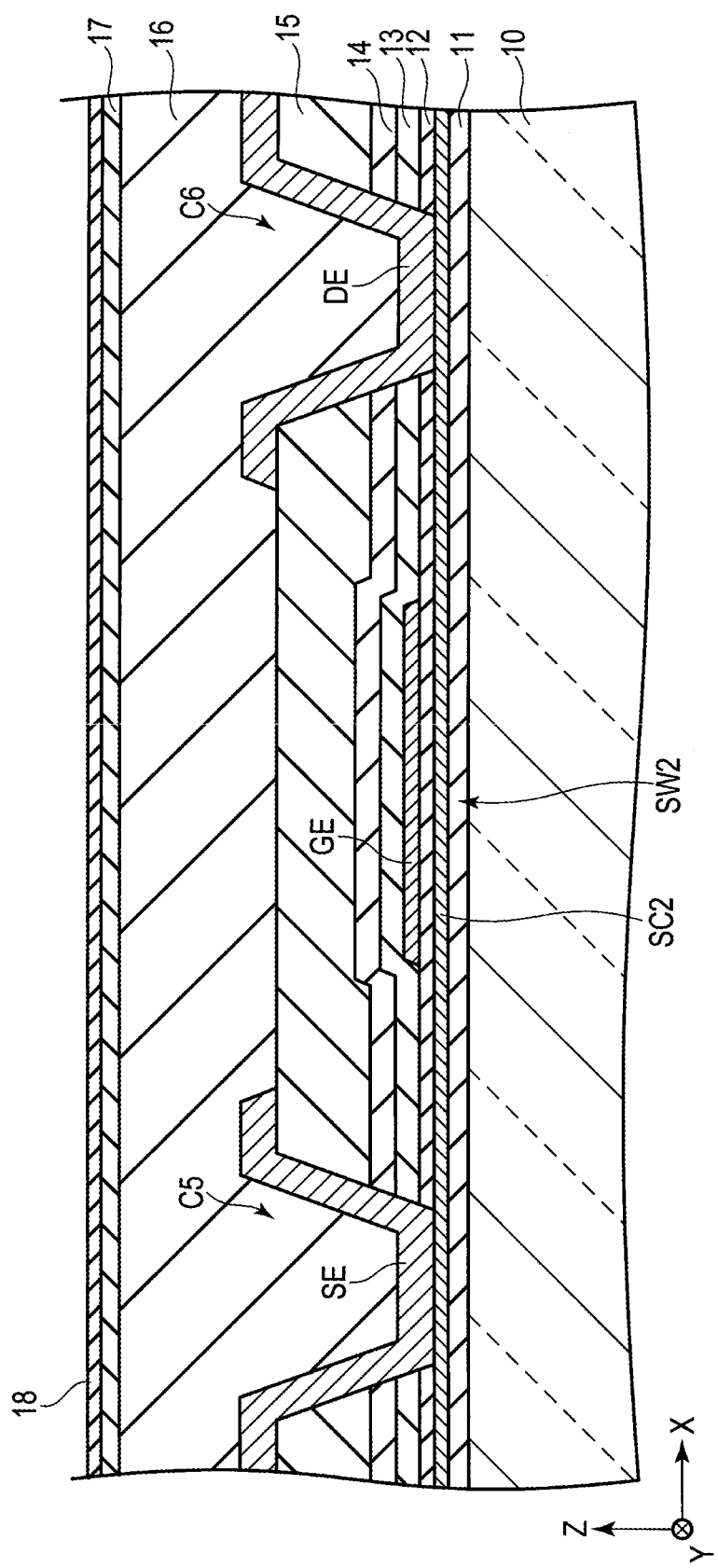
FIG. 8 is a schematic cross-sectional view of a second switching element.

FIG. 8 is a schematic cross-sectional view of the second switching element SW2. The second switching element SW2 comprises a second semiconductor layer SC2 formed of, for example, polycrystalline silicon, a gate electrode GE, a source electrode SE and a drain electrode DE.

The second semiconductor layer SC2 is formed on the first insulating layer 11, and is covered with the second insulating layer 12. The gate electrode GE is formed on the second insulating layer 12, and is covered with the third insulating layer 13. The gate electrode GE faces the second semiconductor layer SC2 via the second insulating layer 12.

The source electrode SE and the drain electrode DE are formed on the fifth insulating layer 15. A fifth contact hole C5 and a sixth contact hole C6 are provided in the second insulating layer 12, the third insulating layer 13, the fourth insulating layer 14 and the fifth insulating layer 15. The source electrode SE is in contact with the second semiconductor layer SC2 through the fifth contact hole C5. The drain electrode DE is in contact with the second semiconductor layer SC2 through the sixth contact hole C6.

In the structures shown in FIG. 2 to FIG. 8, the scanning line G is formed in a first layer. In the present embodiment, the first layer corresponds to the layer provided on the fourth insulating layer 14 (in other words, the layer provided under the fifth insulating layer 15). For example, the scanning line G may be formed by forming a base metal layer on the fourth insulating layer 14 and patterning the metal layer.

The shield line SLD and the gate electrode GE are formed in a second layer. In the present embodiment, the second layer corresponds to the layer provided on the second insulating layer 12 (in other words, the layer provided under the third insulating layer 13). The shield line SLD and the gate electrode GE may be formed of the same material in the same process by forming a base metal layer on the second insulating layer 12 and the patterning the metal layer.

The signal line S, the conductive layer CL, the relay electrode RE, the source electrode SE and the drain electrode DE are formed in a third layer. In the present embodiment, the third layer corresponds to the layer provided on the fifth insulating layer 15 (in other words, the layer provided under the sixth insulating layer 16). The signal line S, the conductive layer CL, the relay electrode RE, the source electrode SE and the drain electrode DE may be formed of the same material in the same process by, for example, forming a base metal layer on the fifth insulating layer 15 and the first and third to sixth contact holes C1 and C3 to C6 and patterning the metal layer.

For example, the first and third to sixth contact holes C1 and C3 to C6 may be formed in the same etching process. To reduce the contact resistance between the second semiconductor layer SC2 formed of polycrystalline silicon and the source or drain electrode SE or DE, the surface of the second semiconductor layer SC2 exposed by the fifth and sixth contact holes C5 and C6 needs to be cleaned by hydrofluoric acid aqueous solution before these electrodes are formed. At the time of this cleaning, the inner side of the first and third contact holes C1 and C3 are also exposed to hydrofluoric acid aqueous solution. The first semiconductor layer SC1 which is an oxide semiconductor may be eroded by hydrofluoric acid aqueous solution. However, in the present embodiment, the first and second protective layers PM1 and PM2 are provided on the surface of the first semiconductor layer SC1. Thus, the first semiconductor layer SC1 can be protected.

The signal line S, the conductive layer CL, the relay electrode RE, the source electrode SE and the drain electrode DE have, for example, a stacked structure in which aluminum or an aluminum alloy is interposed between titanium or titanium alloys. However, these elements may have a single-layer structure formed of a metal material.

The scanning line G, the shield line SLD and the gate electrode GE are formed of, for example, a metal material such as a molybdenum tungsten alloy (MoW). For example, these elements have a single-layer structure. However, they may have a stacked structure.

In the present embodiment explained above, the shield line SLD is provided under the intersection area CA of the first semiconductor layer SC1. Therefore, the above leak current can be prevented, thereby increasing the reliability of the display device 1.

If the shield line SLD is floating, the shield line SLD is coupled to the signal line S and the pixel electrode PE. Thus, the potential of the pixel electrode PE may be changed by the effect of the potential of the signal line S. The change in the potential of the pixel electrode PE is visually recognized as a flicker, and leads to reduced display quality. In the present embodiment, the scanning line G is electrically connected to the shield line SLD. Thus, the potential of the scanning line G is the same as that of the shield line SLD. The potential of the signal line S does not have an influence on the potential of the pixel electrode PE through the shield line SLD. In this way, a flicker is prevented, thereby improving the display quality of the display device 1.

In recent years, the fineness of pixels has been increased. In pixels with high fineness, a flicker may notably occur due to coupling between the signal lines S and the pixel electrodes PE. However, in the structure of the present embodiment, a flicker can be desirably prevented even when the fineness of the pixels PX is increased.

To reduce power consumption, the drive frequency of the display device 1, which is normally approximately 60 Hz, may be set so as to be low. For example, the drive frequency may be set to 30 or 15 Hz. A flicker caused by the change in the potential of pixels is difficult to visually recognize when the drive frequency is high. However, a flicker is easily recognized when the drive frequency is low. In the present embodiment, the visual recognition of a flicker can be prevented even when the drive frequency is low by preventing the change in the potential of pixels.

The shield line SLD is formed of the same material in the same layer as the gate electrode GE of the second switching element SW2 provided in the surrounding area SA. Thus, the shield line SLD and the gate electrode GE can be formed in a single process. In this manner, the manufacturing cost can be reduced.

In addition to the above effects, various preferable effects can be obtained from the present embodiment.

Second Embodiment

A second embodiment is explained. The same structural elements as the first embodiment are denoted by the same reference numbers. Structures or effects which are not particularly referred to are the same as those of the first embodiment.

As an example of a preferable layout of a contact portion CP in a display area DA, the present embodiment discloses the relationship between a spacer for maintaining the cell gap of a liquid crystal layer LC and the contact portion CP.

Figure 9:
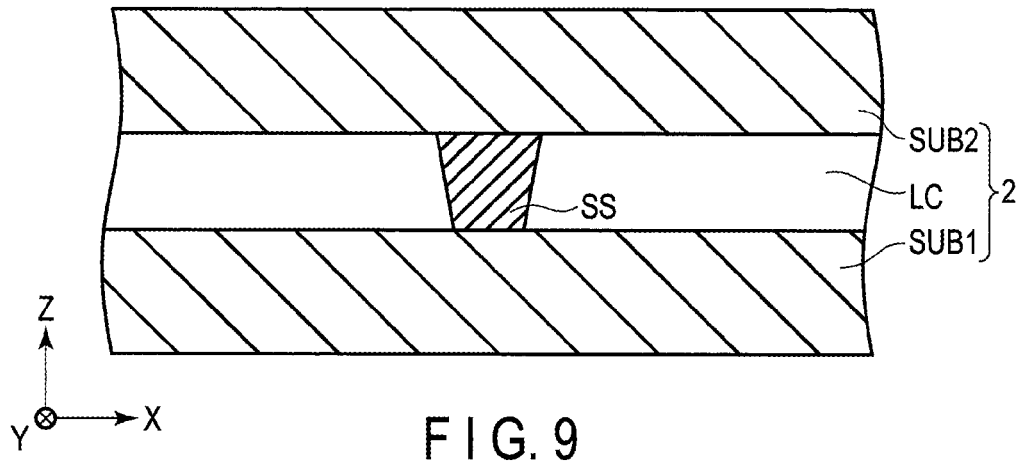
FIG. 9 is a cross-sectional view schematically showing a spacer according to a second embodiment.

FIG. 9 is a cross-sectional view schematically showing an example of a spacer SS. The spacer SS is provided between a first substrate SUB1 and a second substrate SUB2. For example, the spacer SS is provided on the second substrate SUB2. The distal end of the spacer SS is in contact with the first substrate SUB1. The spacer SS may be provided between the above overcoat layer 23 and second alignment film 24. Alternatively, the spacer SS may be provided under the second alignment film 24. FIG. 9 shows only one spacer SS. However, a plurality of spacers SS are provided in the display area DA.

Figure 10:
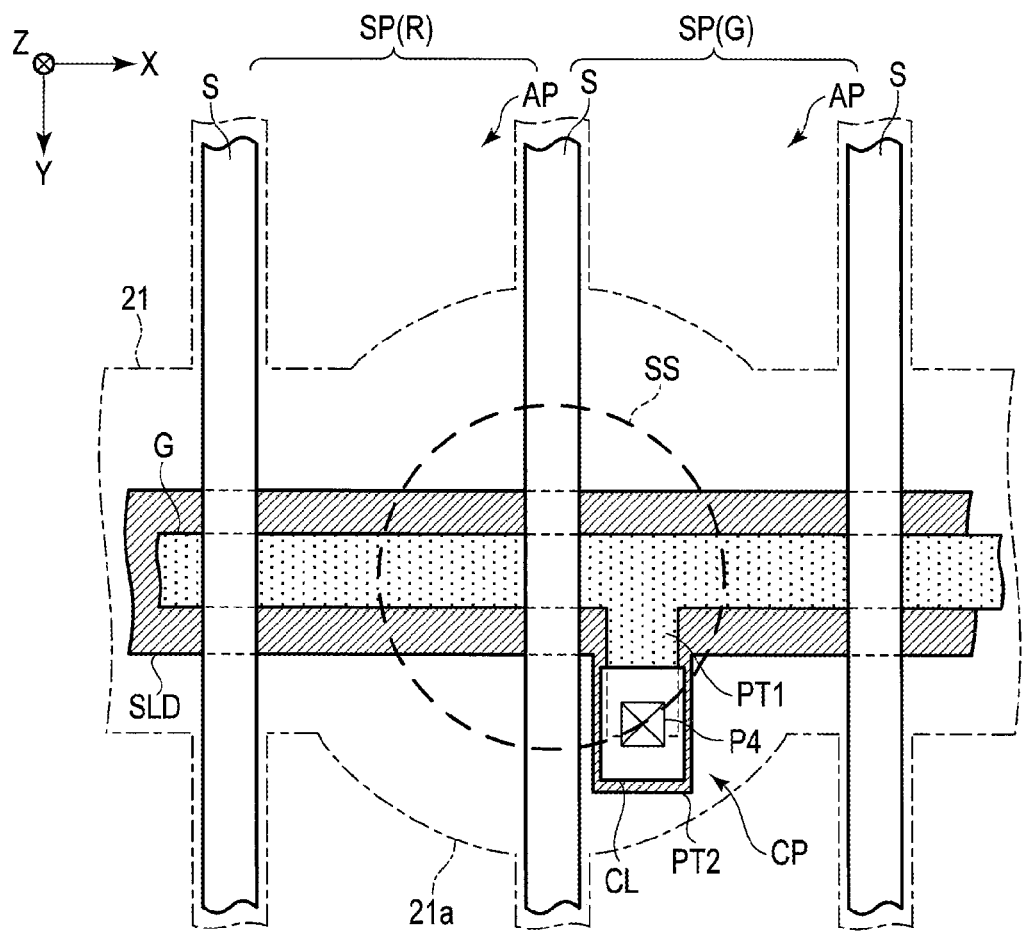
FIG. 10 is a schematic plan view of a display device near the spacer.

FIG. 10 is a schematic plan view of a display device 1 near the spacer SS. In FIG. 10, the first switching element SW1 and the pixel electrode PE shown in FIG. 3 are omitted. The dashed circle corresponds to the planar shape of the spacer SS. The spacer SS is provided in, for example, the area in which a scanning line G intersects a signal line S.

A light-shielding layer 21 has a lattice shape in which the light-shielding layer 21 overlaps the scanning line G and the signal lines S as seen in plan view. Further, the light-shielding layer 21 comprises an enlarged portion 21a around the spacer SS. The contact portion CP overlaps the enlarged portion 21a as seen in plan view.

In the example of FIG. 10, the enlarged portion 21a corresponds to a portion in which the width of the light-shielding layer 21 is enlarged such that the portion has a diameter greater than that of the spacer SS and is concentric with the spacer SS. Near the spacer SS, the alignment of liquid crystal molecules in the liquid crystal layer LC may be disturbed. However, when the enlarged portion 21a is provided, the effect of the disturbance on the display image can be prevented.

In the example of FIG. 10, the spacer SS and the enlarged portion 21a are provided between the red subpixel SP (R) and the green subpixel SP (G). The contact portion CP is provided in the green subpixel SP. However, the layout of the spacer SS, the enlarged portion 21a and the contact portion CP is not limited to this example.

In the structure of the present embodiment explained above, the contact portion CP can be shielded from light in the enlarged portion 21a for shielding the vicinity of the spacer SS from light. In this way, there is no need to enlarge the light-shielding layer 21 only for the contact portion CP. Thus, it is possible to prevent reduction in the area of an aperture AP (aperture ratio) caused by providing the contact portion CP.

Third Embodiment

A third embodiment is explained. The same structural elements as the above embodiments are denoted by the same reference numbers. Structures or effects which are not particularly referred to are the same as those of the above embodiments.

FIG. 11 is a schematic plan view showing an example of a layout of pixels PX, dummy pixels DPX and contact portions CP. In the present embodiment, the contact portions CP are provided in a surrounding area SA. More specifically, in the example of FIG. 11, the contact portions CP are provided in the dummy pixels DPX.

For example, a contact portion CP may be provided in each of the dummy pixels DPX closest to a display area DA on both sides of the display area DA in a first direction X. It should be noted that the contact portions CP may be provided in other dummy pixels DPX. Alternatively, the contact portions CP may be provided at positions outside the dummy pixels DPX in the surrounding area SA.

FIG. 12 is a schematic plan view of a dummy pixel DPX and a contact portion CP provided in the dummy pixel DPX. The dummy pixel DPX comprises a first switching element SW1 and a pixel electrode PE in a manner similar to that of a normal subpixel SP. It should be noted that no signal line S is provided near the dummy pixel DPX. Thus, a first semiconductor layer SC1 provided in the first switching element SW1 is not connected to any signal line S.

The dummy pixels DPX are provided in the surrounding area SA. Thus, the entire dummy pixels DPX overlap a light-shielding layer 21 as seen in plan view. Thus, the dummy pixels DPX are not visually recognized from outside. By providing the dummy pixels DPX, the subpixels SP provided in the display area DA can be protected from electrostatic breakdown, thereby increasing the reliability of a display device 1.

The contact portion CP has the same structure as the example of FIG. 3. Since the light-shielding layer 21 is entirely provided in the surrounding area SA, the contact portion CP also overlaps the light-shielding layer 21.

In the structure of the present embodiment, the contact portions CP are provided in the surrounding area SA. Thus, the contact portions CP do not have an influence on the aperture ratio of each subpixel SP in the display area DA. In addition, when the contact portions CP are provided in the dummy pixels DPX, there is no need to separately define a space for providing the contact portions CP in the surrounding area SA. Thus, the thickness of the frame of the display device 1 can be reduced.

All of the display devices which may be realized by a person of ordinary skill in the art by appropriately changing the design based on the display device explained as each embodiment of the present invention also fall within the scope of the present invention as long as they encompass the spirit of the invention.

Various modification examples which may be conceived by a person of ordinary skill in the art in the scope of the idea of the present invention will also fall within the scope of the invention. For example, even if a person of ordinary skill in the art arbitrarily modifies the above embodiments by adding or deleting a structural element or changing the design of a structural element, or adding or omitting a step or changing the condition of a step, all of the modifications fall within the scope of the present invention as long as they are in keeping with the spirit of the invention.

Further, other effects which may be obtained from the embodiments and are self-explanatory from the descriptions of the specification or can be arbitrarily conceived by a person of ordinary skill in the art are considered as the effects of the present invention as a matter of course.

What is claimed is:

1. A display device comprising:
an insulating substrate;
a pixel provided in a display area;
a scanning line extending in a first direction in the display area;
a signal line extending in a second direction intersecting the first direction in the display area;
a shield line provided between the insulating substrate and the scanning line, facing the scanning line and extending in the first direction;
a pixel electrode provided in the pixel; and
a first switching element including a first semiconductor layer and provided in the display area, wherein
the first semiconductor layer is provided between the scanning line and the shield line, and comprises an intersection area in which the first semiconductor layer intersects the scanning line,
the shield line overlaps the intersection area in plan view, and is electrically connected to the scanning line through a contact portion, and
the contact portion comprises:
a first protrusion protruding from the scanning line in a direction intersecting the first direction in plan view;
a second protrusion protruding from the shield line in a direction intersecting the first direction in plan view; and
a conductive layer which is in contact with the first protrusion and the second protrusion.

2. The display device of claim 1, further comprising
a second switching element provided outside the display area, wherein
the second switching element includes a second semiconductor layer, and a gate electrode facing the second semiconductor layer, and
the shield line is formed of a same material as the gate electrode.

3. A display device comprising:
an insulating substrate;
a pixel provided in a display area;
a scanning line extending in a first direction in the display area;
a signal line extending in a second direction intersecting the first direction in the display area;
a shield line provided between the insulating substrate and the scanning line, facing the scanning line and extending in the first direction;
a pixel electrode provided in the pixel;
a first switching element including a first semiconductor layer and provided in the display area;
a first substrate comprising the insulating substrate, the scanning line, the signal line,
the shield line, the pixel electrode and the first switching element;
a second substrate including a light-shielding layer and facing the first substrate, the light-shielding layer overlapping the scanning line, the signal line and the shield line in plan view and comprising an aperture area in the pixel;
a display function layer provided between the first substrate and the second substrate; and
a dummy pixel provided outside the display area, wherein
the first semiconductor layer is provided between the scanning line and the shield line, and comprises an intersection area in which the first semiconductor layer intersects the scanning line,
the shield line overlaps the intersection area in plan view, and is electrically connected to the scanning line through a contact portion,
the contact portion overlaps the light-shielding layer in plan view, and is provided in the dummy pixel, and
the light-shielding layer overlaps the dummy pixel in plan view.

4. The display device of claim 3, further comprising
a spacer provided between the first substrate and the second substrate in the display area, wherein
the light-shielding layer has a lattice shape in which the light-shielding layer overlaps the scanning line and the signal line in plan view, and comprises an enlarged portion in which a width is enlarged around the spacer, and
the contact portion overlaps the enlarged portion in plan view.

5. The display device of claim 1, wherein
the pixel includes a green subpixel, and
the contact portion is provided in the green subpixel.

6. The display device of claim 1, further comprising:
a conductive first protective layer covering a part of the first semiconductor layer; and a relay electrode which is in contact with the first protective layer and the pixel electrode.

7. The display device of claim 1, further comprising a conductive second protective layer covering a part of the first conductive layer, wherein the signal line is in contact with the second protective layer.

8. The display device of claim 1, wherein a width of the shield line in the second direction is greater than a width of the scanning line in the second direction.

* * * * *